Oct. 28, 1952  N. E. WAHLBERG ET AL  2,615,350
HAND BRAKE CONTROL

Filed June 10, 1946  2 SHEETS—SHEET 1

NILS ERIK WAHLBERG
JOSEPH F. SLADKY
INVENTORS

BY Carl J. Barbee

THEIR ATTORNEY

Oct. 28, 1952 N. E. WAHLBERG ET AL 2,615,350
HAND BRAKE CONTROL

Filed June 10, 1946 2 SHEETS—SHEET 2

NILS ERIK WAHLBERG
JOSEPH F. SLADKY
INVENTORS

BY Carl J. Barbee

THEIR ATTORNEY

Patented Oct. 28, 1952

2,615,350

UNITED STATES PATENT OFFICE 2,615,350

HAND BRAKE CONTROL

Nils Erik Wahlberg, Chicago, Ill., and Joseph F. Sladky, Detroit, Mich., assignors to Nash-Kelvinator Corporation, Kenosha, Wis., a corporation of Maryland Application June 10, 1946, Serial No. 675,738

4 Claims. (Cl. 74—501)

This invention relates to hand brake controls, more particularly, to a hand brake control for brakes of the type used in motor vehicles.

It is an object of this invention to provide a hand brake control of the cable type which will prevent excessive wear of the cables thereof.

It is another object of this invention to provide a hand brake control for a vehicle which is easily adjusted and maintained in an operative condition.

It is a further object of this invention to provide a hand brake control for motor vehicles which is simple in design and economical to manufacture.

Further objects and advantages of this invention will be apparent from the following description, claims and drawings in which like characters are used to designate like parts and of which there are two sheets in which:

Figure 1:
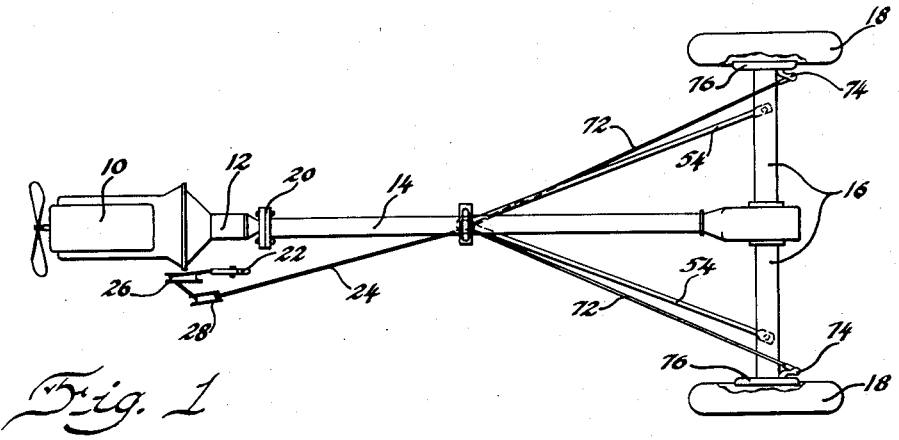
Figure 1 is a plan view of a portion of the driving mechanism of an automobile showing the invention as applied thereto.

Illustrated in Figure 1 is the driving mechanism of the torque tube type for a motor vehicle comprising an engine 10, a transmission 12, a torque tube 14, rear axle housings 16 and wheels 18. The vehicle is driven by the transmission of power from the engine 10 through the transmission 12 to the drive shaft (not shown) within torque tube 14 to the rear axles within housings 16 to the wheels 18 for rotation thereof. A forward motion created by this transmission of power is transmitted to the body portion of the vehicle by torque tube 14 being rigidly secured near its forward end to the cross member (not shown) of the body.

A flexible connection 20 is provided between transmission 12 and torque tube 14. It will be noted that all of the parts of the mechanism described which are to the rear of transmission 12 will be raised and lowered as the wheels 18 move upwardly and downwardly when the vehicle is being driven on a rough surface.

All automobiles are provided with a secondary braking system which is usually of a mechanical nature and provided for emergency purposes and as a means of applying the brakes associated with the rear wheels of the automobile when said automobile is left unattended. This type of braking system almost invariably is manually controlled and provides a hand lever such as lever 22 within the passenger compartment which may be rotated to apply the brakes. It is customary to use cables as connecting means intermediate a lever such as lever 22 and the brakes of the rear wheels. It has been found that if such cables are secured to frame members or body members for guiding and carrying said cables intermediate of the lever 22 and the rear wheels 18, that the oscillation of said wheels will whip the cables and cause said cables to wear excessively adjacent the above-mentioned connection means resulting in subsequent failure of the hand braking control mechanism.

Figure 2:
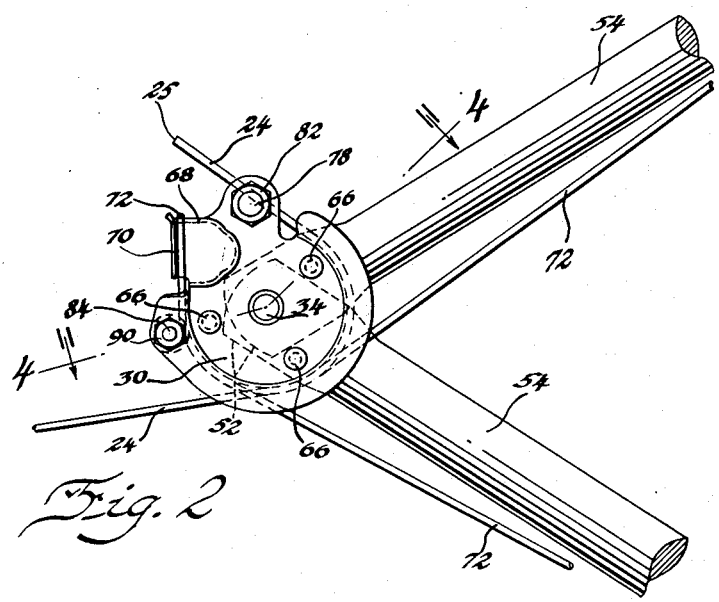
Figure 2 is a view from below the invention as shown in Figure 1 and looking upwardly.

This invention provides a hand brake control mechanism comprising a hand lever 22 manually rotatable to pull cable 24 which is rigidly secured at its one end to lever 22. Cable 24 from its connection with lever 22 passes over pulley 26 and pulley 28 and backwardly therefrom over a portion of pulley 30 to which it is rigidly secured near its one end 25 (Figure 2). Pulleys 26 and 28 may be rotatably secured to body means, preferably outside the passenger compartment.

Figure 3:
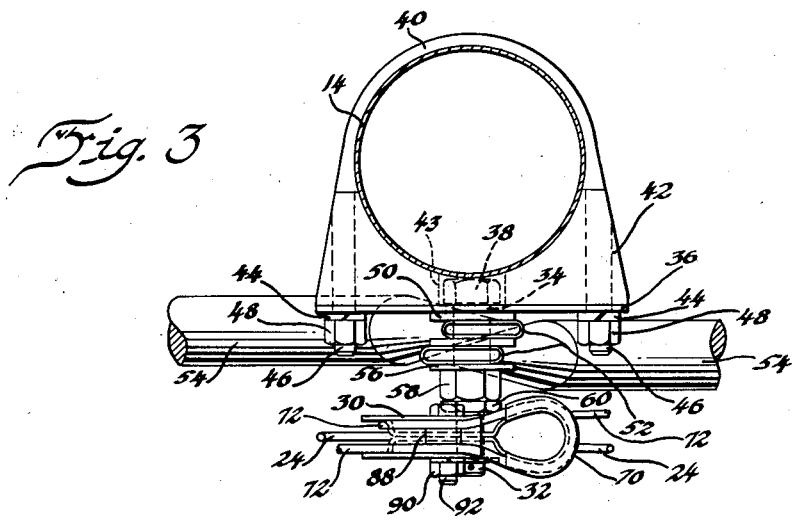
Figure 3 is a front elevational view of the invention, partially in section, as shown in Figure 2.
Figures 4, 5:
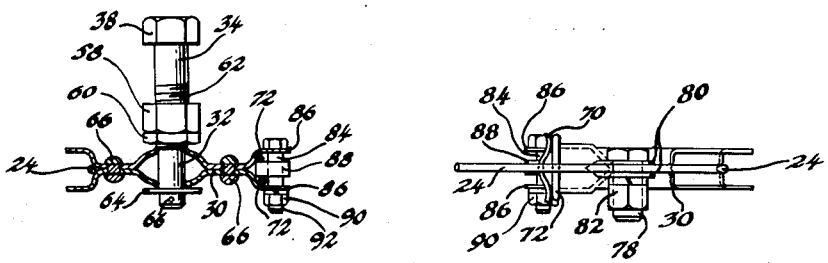
Figure 4 is a side elevational view, partially in section, as taken along lines 4—4 of Figure 2 looking in the direction of the arrows.
Figure 5 is a side elevational view of a portion of the invention as shown in Figure 2.

Pulley 30 is rotatably mounted on the lower reduced portion 32 of bolt 34 (Figures 3 and 4). Bolt 34 extends downwardly through an aperture in plate 36 and has its head portion 38 adjacent the top of said plate. Plate 36 is carried by a U-bolt 40 positioned over the top of torque tube 14 and having its ends extending through aligned apertures in saddle 42 and plate 36. Saddle 42 is positioned against the underside of torque tube 14 and plate 36 is held against the underside of saddle 42 by lock washers 44 telescopically positioned and held on the lower threaded ends 46 of U-bolt 40 by nuts 48 turned on the threaded ends 46 of bolt 40. Saddle 42 is provided with a vertical aperture 43 near its center in which is positioned the head 38 of bolt 34.

Telescopically positioned around bolt 34 and immediately below plate 36 is a washer 50. Immediately below washer 50 and telescopically positioned on bolt 34 are the forward pinched ends 52 of brace rods 54. Rods 54 extend rearwardly and outwardly from their forward connection with torque tube 14 and have their rearward ends rigidly secured to the axle housings 16. Rods 54 are provided to aid in the transmission of power from the wheels 18 through the torque tube 14.

Immediately below ends 52 of rods 54 is a washer 56 telescopically positioned around bolt 34 which is rigidly secured against the underside of the lower end 52 by a first nut 58 turned on threaded portion 62 (Figure 4) of bolt 34 and a lock nut 60 turned on said threaded portion of bolt 34 directly below nut 58 to hold nut 58 in the desired position.

Directly below threaded portion 62 bolt 34 is provided with a reduced portion 32 on which is rotatably positioned the pulley 30. Pulley 30 is rotatably held thereon by washer 64 telescopically positioned around portion 32 and held thereon by a cotter pin extending through aperture 66 in portion 32.

Pulley 30 is comprised of a pair of stampings held together by rivets 66 and is provided with a horseshoe-shaped portion 68 (Figure 2) having a flange 70 on its outer side. A cable 72 has an intermediate portion positioned over member 68 from which cable 72 extends to its ends which are rotatably secured to brake levers 74 extending outwardly through apertures in the brake backing plates 76 carried by the axle housings 16 adjacent the wheels 18. Flange 70 is provided to prevent cable 72 from slipping off member 68. The brake mechanism has not been shown since any one of several mechanical brakes would be operative with the use of this invention.

Cable 24 passes over pulley 30 and is secured thereto by bolt 78 (Figures 2 and 5) which passes through aligned apertures in spaced portions 80 of pulley 30 and has a nut 82 turned on the lower end thereof to squeeze a portion of cable 24 between portions 80 to rigidly secure cable 24 to pulley 30. In this manner when cable 24 is pulled by rotating lever 22 pulley 30 will be rotated in a clockwise direction, as shown in Figure 2 which is looking at the lower side of the invention, as shown in the other views, which will pull cables 72 forward thus pulling brake levers 74 forward to engage the brakes associated with wheels 18.

Pulley 30 is provided with a clamping means (Figures 4 and 5) for cable 72 which comprises a bolt 84 extending through aligned apertures in spaced portions 86 of pulley 30 having a spacing sleeve 88 telescopically positioned on bolt 84 intermediate the portions 86 and designed to force cable 72 into frictional engagement with portions 86 and sleeve 88 on either side of said sleeve by turning nut 90 on the lower threaded end 92 of bolt 84. This means is provided to prevent cable 72 from slipping on pulley 30 thus causing excessive wear of cable 72 and also to provide adjustment of cable 72 in case the brake linings of one of the wheel brakes should wear excessively thereby requiring its lever 74 to be pulled further to engage that particular brake.

In this manner the inventor has provided a hand brake control mechanism of the cable type wherein the cables associated with the brakes of the rear wheels of the vehicle are moved upwardly and downwardly with said wheels and therefore are not subject to excessive whipping as is the case when said brake cables are secured to or guided by means carried by frame or body members which do not move in direct relation to the rear wheels of the vehicle.

Numerous modifications will at once occur to those skilled in the art and it is contemplated that any modifications falling within the scope of the appended claims are expressly reserved even though the invention has been described in considerable detail in the modification disclosed.

What is claimed and is desired to be secured by Letters Patent is:

1. A pulley having a circumferential cable groove, a clamping means for a cable comprising aligned apertures formed in the opposing flanges of the pulley, a bolt extending through said apertures, a spacer telescopically positioned on said bolt between said flanges, and a nut on said bolt to force said flanges inwardly toward said spacer.

2. A pulley having a circumferential cable groove, a loop-like projection formed on said pulley, a clamping mechanism formed on said pulley comprising aligned apertures formed in the opposing flanges of the pulley, a bolt extending through said apertures, a spacer telescopically positioned on said bolt between said flanges, and a nut turned on said bolt to force said flanges toward the spacer.

3. A pulley having a circumferential cable groove, a fixed projection formed on said pulley over which a cable may be passed intermediate the ends thereof, a clamping mechanism for such a cable formed on the pulley and comprising aligned apertures formed in the opposing flanges of the pulley, a bolt extending through said apertures, a spacer telescopically positioned on said bolt between said flanges, and a nut turned on said bolt for forcing said flanges toward said spacer.

4. A pulley, a projection formed on said pulley over which a cable may be passed intermediate the ends thereof, a clamping mechanism for a cable formed on the pulley comprising aligned apertures formed in the opposing sides of the groove of the pulley, a bolt extending through said apertures, a spacer telescopically positioned on said bolt between said sides of the groove, and a nut on the end of said bolt to force said sides inwardly toward said spacer.

NILS ERIK WAHLBERG.
JOSEPH F. SLADKY.

REFERENCES CITED

The following references are of record in the file of this patent:

UNITED STATES PATENTS

| Number | Name | Date |
| --- | --- | --- |
| 350,995 | Rich | Oct. 19, 1886 |
| 922,916 | Krause | May 25, 1909 |
| 1,507,601 | Hamaker | Sept. 9, 1924 |
| 1,567,550 | Stebbins | Dec. 29, 1925 |
| 1,597,930 | Smith | Aug. 31, 1926 |
| 1,782,020 | Allen | Nov. 18, 1930 |
| 1,789,736 | Foyle | Jan. 20, 1931 |
| 1,857,437 | Cole | May 10, 1932 |
| 2,018,915 | House | Oct. 29, 1935 |
| 2,418,565 | Wohler | Apr. 8, 1947 |

FOREIGN PATENTS

| Number | Country | Date |
| --- | --- | --- |
| 116,775 | Austria | Mar. 10, 1930 |
| 330,620 | Great Britain | June 10, 1930 |